US010334521B2

(12) United States Patent
Sasadai

(10) Patent No.: US 10,334,521 B2
(45) Date of Patent: Jun. 25, 2019

(54) INFORMATION PROCESSING DEVICE THAT CONTROLS WIRELESS NETWORK FUNCTION TO REDUCE POWER CONSUMPTION, AND RECORDING MEDIUM THEREFOR

(71) Applicant: Kyocera Document Solutions Inc., Osaka (JP)

(72) Inventor: Koji Sasadai, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 134 days.

(21) Appl. No.: 15/356,544

(22) Filed: Nov. 19, 2016

(65) Prior Publication Data

US 2017/0150439 A1 May 25, 2017

(30) Foreign Application Priority Data

Nov. 19, 2015 (JP) .................................. 2015-226349

(51) Int. Cl.
| | |
|---|---|
| H04W 52/02 | (2009.01) |
| H04L 29/08 | (2006.01) |
| H04L 12/12 | (2006.01) |
| H04W 84/12 | (2009.01) |
| H04W 88/06 | (2009.01) |
| H04L 29/12 | (2006.01) |

(52) U.S. Cl.
CPC ......... *H04W 52/0212* (2013.01); *H04L 12/12* (2013.01); *H04L 67/1074* (2013.01); *H04L 67/28* (2013.01); *H04L 61/103* (2013.01); *H04W 84/12* (2013.01); *H04W 88/06* (2013.01); *Y02D 30/40* (2018.01); *Y02D 70/142* (2018.01); *Y02D 70/22* (2018.01)

(58) Field of Classification Search
None
See application file for complete search history.

(56) References Cited

U.S. PATENT DOCUMENTS

| | | | |
|---|---|---|---|
| 9,591,582 B1* | 3/2017 | Rabii | .................. H04W 52/028 |
| 2009/0049220 A1* | 2/2009 | Conti | ..................... G06F 13/24 |
| | | | 710/267 |
| 2016/0212702 A1* | 7/2016 | Ghosh | ............... H04W 52/0216 |

FOREIGN PATENT DOCUMENTS

| | | |
|---|---|---|
| JP | 2002-268778 A | 9/2002 |
| JP | 2008-312020 A | 12/2008 |
| JP | 2009-088918 A | 4/2009 |

* cited by examiner

*Primary Examiner* — Ayaz R Sheikh
*Assistant Examiner* — Sori A Aga
(74) *Attorney, Agent, or Firm* — HEA Law PLLC

(57) ABSTRACT

An information processing device includes a wireless communication unit, a main system, and a subsystem. The information processing device is enabled to selectively execute a ready mode in which at least the main system in its entirety is activated, and a sleep mode in which at least a portion of the main system is not activated. When the information processing device transitions from the ready mode to the sleep mode, if the main system determines that the main system is connected to the wireless network and that peer-to-peer networking is ineffective, the main system carries out configuring of the subsystem to enable the subsystem to respond to the external device via the wireless communication unit during the sleep mode, and the main system transitions to, as the sleep mode, a first sleep mode in which the subsystem is activated without the main system in its entirety being activated.

7 Claims, 5 Drawing Sheets

INFORMATION PROCESSING DEVICE THAT CONTROLS WIRELESS NETWORK FUNCTION TO REDUCE POWER CONSUMPTION, AND RECORDING MEDIUM THEREFOR

INCORPORATION BY REFERENCE

This application is based upon, and claims the benefit of priority from, corresponding Japanese Patent Application No. 2015-226349 filed in the Japan Patent Office on Nov. 19, 2015, the entire contents of which are incorporated herein by reference.

BACKGROUND

Unless otherwise indicated herein, the description in this section is not prior art to the claims in this application and is not admitted to be prior art by inclusion in this section.

A typical electronic device includes an electronic device that operates separately in the following cases: a case where a main system, which operates during an ordinary operation, processes packets received from a network, and a case where a subsystem, which operates during a sleep mode, processes the packets received from the network to ensure low power consumption.

SUMMARY

An information processing device according to an aspect of the disclosure includes a wireless communication unit, a main system, and a subsystem. The wireless communication unit is wirelessly communicable with an external device connected to a wireless network. The main system controls the wireless communication unit. The subsystem controls the wireless communication unit independently from the main system. The information processing device is enabled to selectively execute a ready mode in which at least the main system in its entirety is activated, and a sleep mode in which at least a portion of the main system is not activated. When the information processing device transitions from the ready mode to the sleep mode, if the main system determines that the main system is connected to the wireless network and that peer-to-peer (P2P) networking is ineffective, the main system carries out configuring of the subsystem so as to enable the subsystem to respond to the external device via the wireless communication unit during the sleep mode, and the main system transitions to, as the sleep mode, a first sleep mode in which the subsystem is activated without the main system in its entirety being activated.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
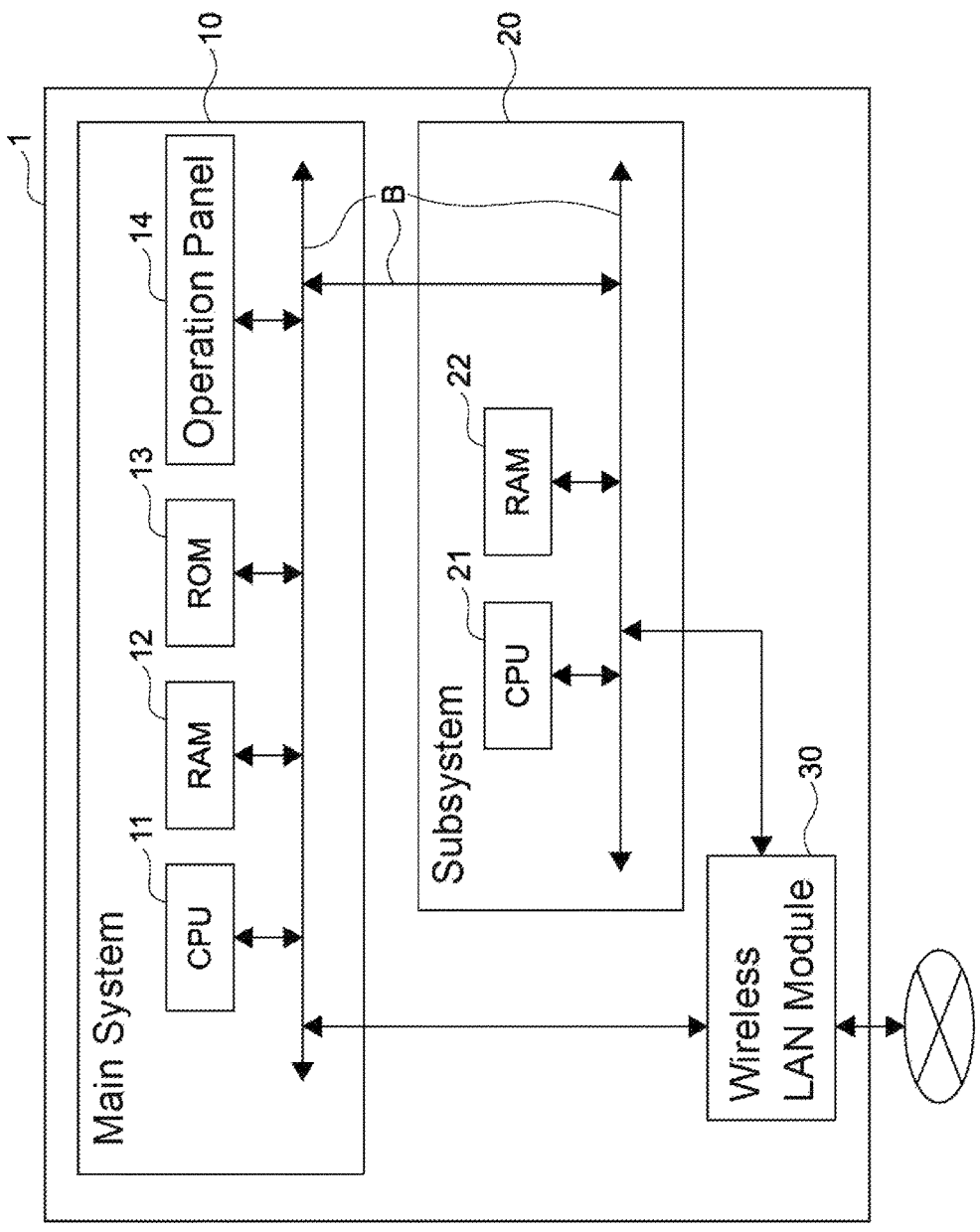
FIG. 1 illustrates a hardware configuration of an information processing device according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Comparative Example

There is provided a typical access point including a terminal determination unit and a proxy response unit. When the terminal determination unit receives Address Resolution Protocol (ARP) request packets from an ARP issuer, the terminal determination unit identifies a destination of the ARP request packet to determine whether or not a wireless terminal corresponding to the destination exists among wireless terminals connecting to its own apparatus (access point). When the wireless terminal corresponding to the destination exists, the proxy response unit creates an ARP response packet of the wireless terminal instead of the wireless terminal to reply to the ARP issuer. However, this technique ensures only an ARP proxy response that is related to any wireless terminal connected to the access point and is transmitted using a small amount of simple information.

There is provided another typical access point that transmits a terminal control packet, which a main apparatus periodically transmits to wireless terminals, by wireless transmission only under a predetermined condition when an operation mode of the wireless terminal is a power-saving mode. The terminal control packet is, for example, an existence confirmation notification and clock information.

An information processing device, such as a personal computer, uses an embedded computer (EC) for power supply control as a sub-CPU for a main central processing unit (CPU) to causes the EC to have a part of link controls and a plurality of profiles (application layers). There is further provided an information processing device that activates a main CPU only when the main CPU is required (that is, a resource unit is used), while an EC executes a minimum process according to kinds of devices, which include connection request sources, and process contents. The resource unit is constituted of, for example, a memory (program memory), a keyboard, a mouse, a display, an HDD (hard disk unit), and a FDD (floppy (registered trademark) disk unit). However, in this technique, the EC simply executes a relatively simple process, such as a series of processes for a device that handles voice data, and a confirmation process of connection to a FAX device or a Human Interface Device (HID).

Embodiment of the Disclosure

The following describes an embodiment of the disclosure with reference to the drawings.

1. Hardware Configuration of Information Processing Device 1

FIG. 1 illustrates a hardware configuration of an information processing device 1 according to an embodiment of the disclosure.

The information processing device 1 includes a main system 10, a subsystem 20, and a wireless LAN module 30 (also referred to as a wireless communication unit). A typical example of the information processing device 1 is an image forming apparatus (for example, a multifunction peripheral (MFP)).

The main system 10 includes a central processing unit (CPU) 11, a random access memory (RAM) 12, a read only memory (ROM) 13, and an operation panel 14.

The CPU 11 functions as an arithmetic processing device and a control device to control general operations of the main system 10 based on various programs. The RAM 12 transitorily stores, for example, programs executed by the CPU 11, and parameters that are appropriately changed due to the execution. The ROM 13 stores, for example, programs used by the CPU 11 and operation parameters. The ROM 13 further stores specific information on the information processing device 1, such as a host name and an IP address. If the information processing device 1 is an MFP, the operation panel 14 is an integrated touch panel where a touch sensor and a display panel are superimposed.

The subsystem 20 includes a CPU 21 and a RAM 22.

The CPU 21 functions as an arithmetic processing device and a control device to control general operations of the subsystem 20 based on the various programs. The RAM 22 transitorily stores, for example, programs executed by the CPU 21, and parameters that are appropriately changed due to the execution.

The main system 10, the subsystem 20, and the wireless LAN module 30 are connected one another via a bus B.

The wireless LAN module 30 is an interface for connecting a wireless LAN. The main system 10 and the subsystem 20 are independently connected to the wireless LAN via the wireless LAN module 30.

2. Respective Modes of Information Processing Device 1

Figure 2:
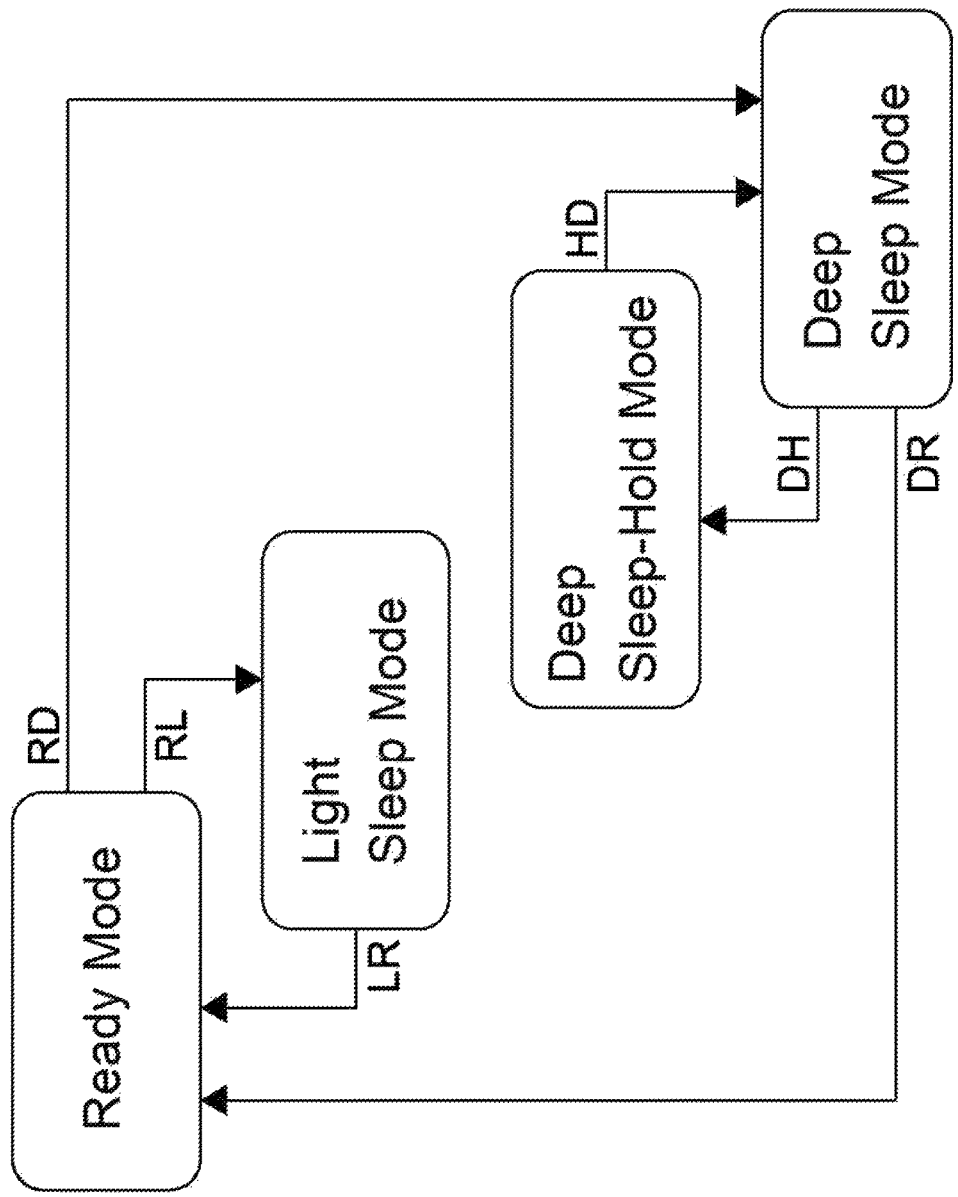
FIG. 2 illustrates a drawing for describing respective modes of the information processing device according to the embodiment.

FIG. 2 illustrates a drawing for describing respective modes of the information processing device 1.

The information processing device 1 selectively operates in a ready mode or a plurality of sleep modes. In the ready mode, at least the entire main system 10 has been activated. In the plurality of the sleep modes, at least a portion of the main system 10 has not been activated. The main system 10 has, compared with the subsystem 20, a high information processing capacity and high power consumption. Consequently, compared with the ready mode where the entire main system 10 is activated, the sleep mode where at least a portion of the main system 10 is not activated can reduce the power consumption. That is, the more processes are executed in respective sleep modes, the more power consumption is reduced.

Here, the plurality of the sleep modes and the ready mode are each described.

(1) Deep Sleep Mode (First Sleep Mode)

"Deep Sleep Mode" is a state where the entire main system 10 is not activated while only the subsystem 20 is activated. Deep Sleep Mode does not activate the entire main system 10, which has the high information processing capacity and high power consumption. This ensures the reduced power consumption. On the other hand, processes that the subsystem 20 can execute are limited. That is, executable processes during Deep Sleep Mode are limited. Deep Sleep Mode is the state where the entire main system 10 is not activated. Thus, it takes time to cause the entire main system 10 to return.

(2) Deep Sleep-Hold Mode

"Deep Sleep-Hold Mode" is a state where only the CPU 11 and the RAM 12, which are in the main system 10, have returned from Deep Sleep Mode (the entire main system 10 is not activated, and only the subsystem 20 is activated). It takes time to return to the ready mode from Deep Sleep Mode since the entire main system 10 is caused to return (as described above). Compared with this, a switching period is reduced when returning to Ready Mode from Deep Sleep-Hold Mode. This is because it is not necessary to cause the entire main system 10 to return.

(3) Light Sleep Mode (Second Sleep Mode)

"Light Sleep Mode" is a Wait-for-Interrupt (WFI) mode, and is a mode where the main system 10 is operable employing an interrupt driven method. Specifically, Light Sleep Mode is a state where the operation panel 14 in the main system 10 is not activated, while the CPU 11, the RAM 12, and the ROM 13 are activated. If the information processing device 1 is the MFP, respective units related to image processing, such as a print engine, a facsimile communication unit, and a scanner are not activated similarly to the operation panel 14. In view of this, a period for the main system 10 to return for returning to the ready mode from Light Sleep Mode is shorter than the period for the main system 10 to return for returning to Ready Mode from Deep Sleep Mode (the entire main system 10 is not activated). On the other hand, compared with Deep Sleep Mode where the entire main system 10 is not activated, Light Sleep Mode has a little high power consumption.

(4) Ready Mode

"Ready Mode" is a state where at least the entire main system 10 is activated, and all the functions of the information processing device 1 are basically executable. For example, information processing other than a wireless communication, such as displaying information on the operation panel 14 to accept an operation input through the operation panel 14, is also executable.

A relation of hardware resource amount to activate the respective modes is "Deep Sleep Mode<Deep Sleep-Hold Mode<Light Sleep Mode<Ready Mode." In other words, with reference to FIG. 2, the hardware resource amount to activate becomes large in the order of modes located from a lower right to an upper left. Thus, the information processing capacity and the power consumption also become large (high) in this order.

The information processing device 1 in Ready Mode is switchable to Light Sleep Mode (an arrow RL illustrated in FIG. 2) and is switchable to Deep Sleep Mode (an arrow RD illustrated in FIG. 2). The information processing device 1 switched to Light Sleep Mode is returnable to Ready Mode again (an arrow LR illustrated in FIG. 2). The information processing device 1 switched to Deep Sleep Mode is returnable to Ready Mode (an arrow DR illustrated in FIG. 2) and is switchable to Deep Sleep-Hold Mode (an arrow DH illustrated in FIG. 2). The information processing device 1 switched to Deep Sleep-Hold Mode is switchable to Deep Sleep Mode again (an arrow HD illustrated in FIG. 2).

When "sleep mode" is simply used in the disclosure, assume that the sleep mode includes at least Deep Sleep Mode and Light Sleep Mode.

3. Functional Configuration of Information Processing Device 1

Figure 3:
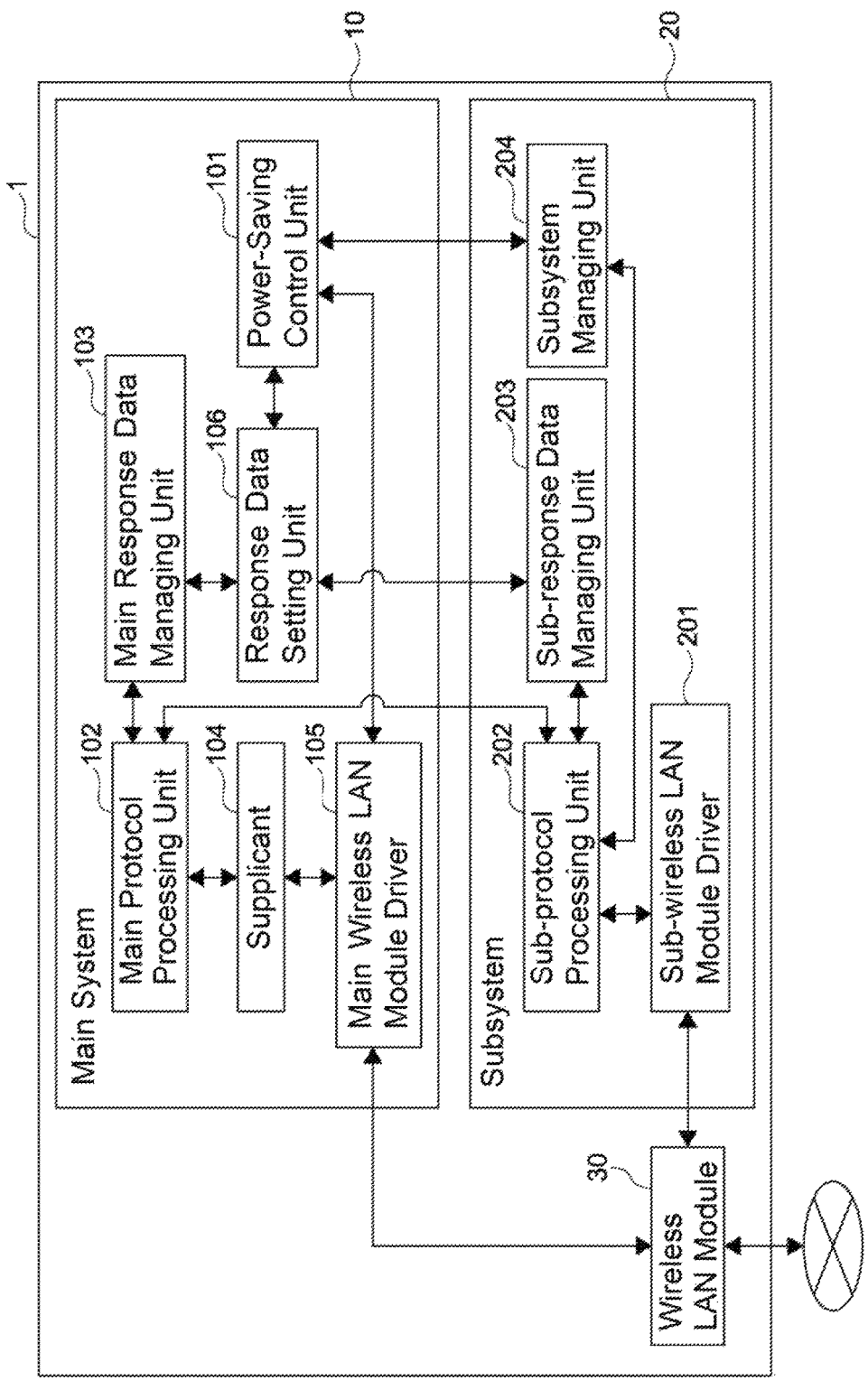
FIG. 3 illustrates a functional configuration of the information processing device according to the embodiment.

FIG. 3 illustrates a functional configuration of the information processing device 1.

The main system 10 includes a power-saving control unit 101, a main protocol processing unit 102, a main response data managing unit 103, a supplicant 104, a main wireless LAN module driver 105, and a response data setting unit 106.

The power-saving control unit 101 switches activation states of a portion of or the entire main system 10 to switch the information processing device 1 to Deep Sleep Mode, Deep Sleep-Hold Mode, Light Sleep Mode, or Ready Mode.

The main protocol processing unit 102 refers to the main response data managing unit 103 to generate response data. The main protocol processing unit 102 supplies the supplicant 104 with the generated response data.

The supplicant 104 controls the main wireless LAN module driver 105 to transmit and receive data to/from an external device connected to the wireless LAN via the wireless LAN module 30.

The response data setting unit 106 stores information that the supplicant 104 needs to respond to the external device (for example, identification information on the information processing device 1 unique) in the main response data managing unit 103 and a sub-response data managing unit 203.

The subsystem 20 includes a sub-wireless LAN module driver 201, a sub-protocol processing unit 202, the sub-response data managing unit 203, and a subsystem managing unit 204.

The sub-wireless LAN module driver 201 transmits and receives data to/from the external device connected to the wireless LAN via the wireless LAN module 30 during Deep Sleep Mode.

The sub-protocol processing unit 202 refers to the sub-response data managing unit 203 to generate response data based on the data received from the external device by the sub-wireless LAN module driver 201.

The subsystem managing unit 204 supplies the main system 10 with a request for returning to Ready Mode from Deep Sleep Mode or a request for switching to Deep Sleep-Hold Mode from Deep Sleep Mode.

4. Operation of Main System 10 when Ready Mode is Switched to Sleep Mode

Figure 4:
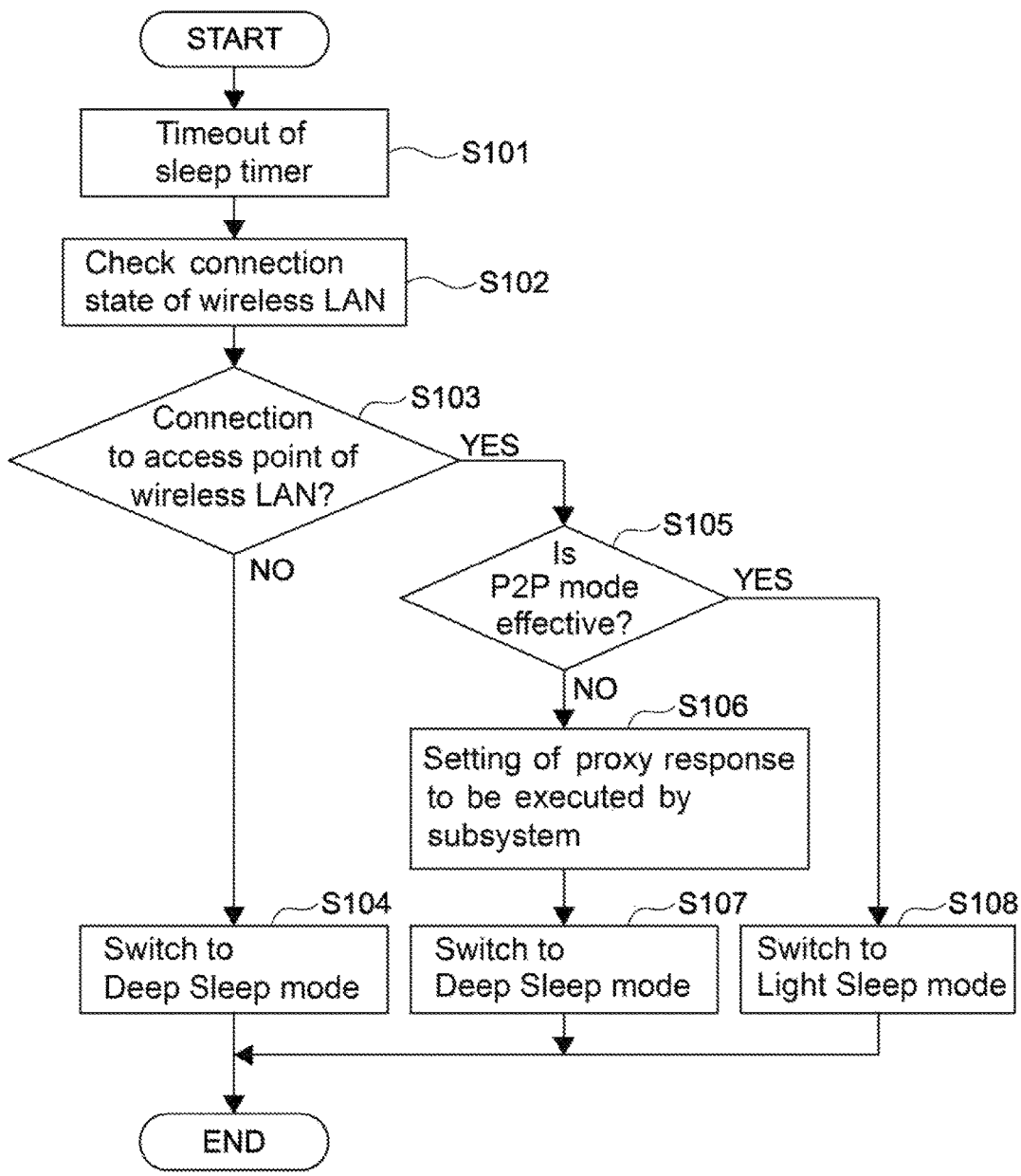
FIG. 4 illustrates an operation of a main system according to the embodiment when a ready mode is switched to a sleep mode.

FIG. 4 illustrates an operation of the main system 10 when Ready Mode is switched to the sleep mode.

Assume that the information processing device 1 operates in Ready Mode. That is, at a time point of the operation start, the information processing device 1 operates in the state where at least the entire main system 10 is activated.

After the power-saving control unit 101 in the main system 10 detects a timeout of a sleep timer (Step S101), the power-saving control unit 101 inquires a connection state of the wireless LAN of the main wireless LAN module driver 105. Every time the operation panel 14 and the wireless LAN module 30 transmit a request to the main system 10 and the subsystem 20, and the timeout of the sleep timer occurs, the sleep timer is reset to start measuring a time.

The main wireless LAN module driver 105 checks the connection state of the wireless LAN in response to the inquiry from the power-saving control unit 101 so as to notify the power-saving control unit 101 (Step S102). Here "connection state of wireless LAN" includes a state of connection to an access point of the wireless LAN, and a connection state in a peer-to-peer (P2P) mode.

When the power-saving control unit 101 determines that the access point of the wireless LAN is not connected based on the notification from the main wireless LAN module driver 105 (NO at Step S103), the power-saving control unit 101 switches to Deep Sleep Mode (Step S104, the arrow RD illustrated in FIG. 2). That is, the power-saving control unit 101 stops the activated entire main system 10.

On the other hand, while the access point of the wireless LAN (YES at Step S103) is connected and the P2P mode is ineffective (NO at Step S105), an event such as a key update may occur, but these occurrence cycles are expected to be long. Thus, the power-saving control unit 101 causes the response data setting unit 106 to set a proxy response for the subsystem 20 (Step S106) to switch to Deep Sleep Mode (Step S107, the arrow RD illustrated in FIG. 2). In the embodiment, "proxy response" means that the subsystem 20 responds to the external device via the wireless LAN module 30 during Deep Sleep Mode. Specifically, as the proxy response setting, the response data setting unit 106 causes the sub-response data managing unit 203 in the subsystem 20 to store information that the subsystem 20 needs to respond to the external device (for example, the identification information on the information processing device 1 unique).

On the other hand, while the access point of the wireless LAN is connected (YES at Step S103) and the P2P mode is effective (YES at Step S105), the event may frequently occur. Thus, the power-saving control unit 101 switches to Light Sleep Mode, where it takes short time to return to Ready Mode, (Step S108, the arrow RL illustrated in FIG. 2).

After that, when the main wireless LAN module driver 105 in the main system 10 obtains the event that requires processing via the wireless LAN module 30 during Light Sleep Mode, the power-saving control unit 101 returns to Ready Mode in the minimum return time (the arrow LR illustrated in FIG. 2). The main system 10 having returned to Ready Mode executes the required processing corresponding to the obtained event.

5. Operation of Subsystem 20 During Deep Sleep Mode

Figure 5:
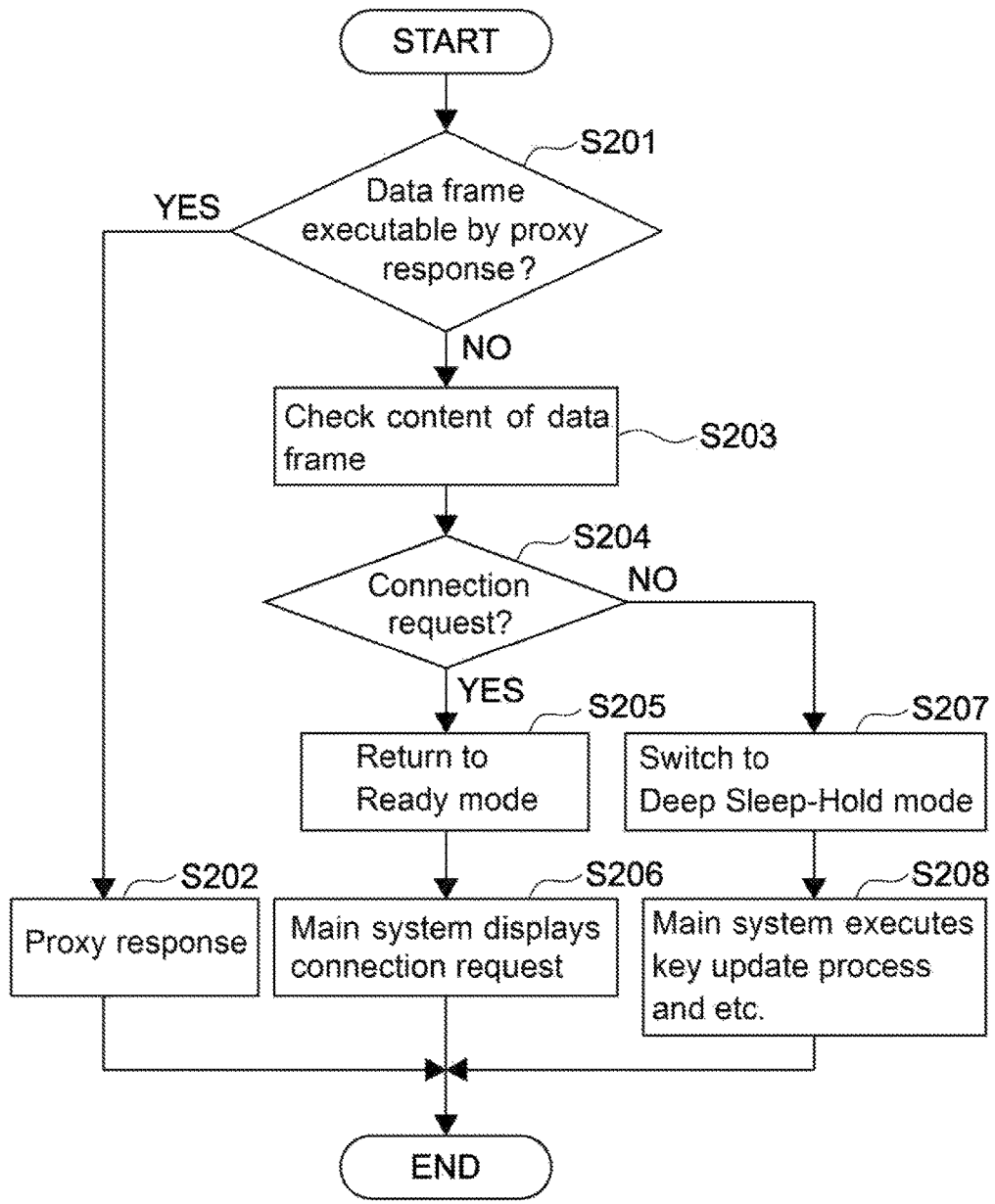
FIG. 5 illustrates an operation of a subsystem according to the embodiment during Deep Sleep Mode.

FIG. 5 illustrates an operation of the subsystem 20 during Deep Sleep Mode.

Assume that the information processing device 1 operates in Deep Sleep Mode. That is, at the time point of the operation start, the information processing device 1 operates in the state where the entire main system 10 is not activated while only the subsystem 20 is activated.

The sub-wireless LAN module driver 201 in the subsystem 20 receives a data frame via the wireless LAN module 30 from the external device connected to the wireless LAN. The sub-wireless LAN module driver 201 supplies the sub-protocol processing unit 202 with the received data frame.

The sub-protocol processing unit 202 determines whether or not the proxy response to the data frame, which is obtained from the sub-wireless LAN module driver 201, is executable (Step S201). Specifically, the sub-protocol processing unit 202 determines whether or not a type of the data frame, which is obtained from the sub-wireless LAN module driver 201, is an ordinary network protocol data frame. If the type of the data frame is the ordinary network protocol data frame (the type of the data frame is unrelated to a wireless unique communication), the sub-protocol processing unit 202 determines that the proxy response is executable (YES at Step S201). In this case, the sub-protocol processing unit 202 refers to the sub-response data managing unit 203 to generate the response data. The sub-protocol processing unit 202 supplies the sub-wireless LAN module driver 201 with the generated response data.

The sub-wireless LAN module driver 201 transmits the response data, which is generated by the sub-protocol processing unit 202, to the external device connected to the wireless LAN via the wireless LAN module 30 (Step S202). As described above, the subsystem 20 directly responds to the external device instead of the main system 10 (the proxy response) still in Deep Sleep Mode, which is the state where the entire main system 10 is not activated (without returning to Ready Mode where the entire main system 10 is activated).

On the other hand, if the type of the data frame is a data frame other than the ordinary network protocol data frame, the sub-protocol processing unit 202 determines that the proxy response is not executable (NO at Step S201). In this case, the sub-protocol processing unit 202 checks a content of the data frame (Step S203). When the sub-protocol processing unit 202 determines that the content of the data frame is a connection request from the external device (YES at Step S204), the sub-protocol processing unit 202 determine that the main system 10 needs to return to Ready Mode where the operation panel 14 is activated since it is necessary that, for example, information indicative of the existence of the connection request is displayed on the operation panel 14. After that, the sub-protocol processing unit 202 requests the subsystem managing unit 204 to return the main system 10 to Ready Mode.

When the subsystem managing unit 204 receives the request, the subsystem managing unit 204 supplies the main system 10 with the request for returning to Ready Mode.

When the power-saving control unit 101 in the main system 10 obtains the request for returning to Ready Mode from the subsystem managing unit 204, the power-saving control unit 101 activates the entire main system 10, that is, the power-saving control unit 101 returns the main system 10 to Ready Mode from Deep Sleep Mode (Step S205, the arrow DR illustrated in FIG. 2).

The sub-protocol processing unit 202 in the subsystem 20 supplies the main system 10 with the data frame (the connection request), which is obtained from the sub-wireless LAN module driver 201.

When the main protocol processing unit 102 in the main system 10 obtains the data frame (the connection request) from the sub-protocol processing unit 202, the main protocol processing unit 102 executes processing, for example, processing that the main protocol processing unit 102 displays this connection request on the operation panel 14 (Step S206).

On the other hand, assume that the sub-protocol processing unit 202 determines that the content of the data frame is not the connection request from the external device (NO at Step S204). The case where the content of the data frame is not a data frame other than the ordinary network protocol data frame and is not the connection request typically means a data frame related to the wireless unique communication, such as "a management and an update process" of the key used for the event and wireless unique security. Controlling the wireless LAN module 30 is enough to execute the processing such as the key update. Consequently, it is only necessary that minimum necessary hardware resources for controlling the wireless LAN module 30 by the main system 10, that is, only the CPU 11 and the RAM 12 are activated. Thus, in this case, the sub-protocol processing unit 202 requests the subsystem managing unit 204 to switch the main system 10 to Deep Sleep-Hold Mode.

When the subsystem managing unit 204 receives the request, the subsystem managing unit 204 supplies the main system 10 with the request for switching to Deep Sleep-Hold Mode.

When the power-saving control unit 101 in the main system 10 obtains the request for switching to Deep Sleep-Hold Mode from the subsystem managing unit 204, the CPU 11 and the RAM 12 are activated. This causes the information processing device 1 to switch to Deep Sleep-Hold Mode from Deep Sleep Mode (Step S207, the arrow DH illustrated in FIG. 2).

The sub-protocol processing unit 202 in the subsystem 20 supplies the main system 10 with the data frame (the data frame related to "the management and the update process" of the key), which is obtained from the sub-wireless LAN module driver 201.

When the main protocol processing unit 102 in the main system 10 obtains the data frame (the data frame related to "the management and the update process" of the key) from the sub-protocol processing unit 202, the main protocol processing unit 102 refers to the main response data managing unit 103 to generate the response data. The main protocol processing unit 102 supplies the supplicant 104 with the generated response data. The supplicant 104 controls the main wireless LAN module driver 105 to transmit the response data, which is generated by the main protocol processing unit 102, to the external device, which is connected to the wireless LAN, via the wireless LAN module 30 (Step S208).

For example, similarly to Step S101, the timeout of the sleep timer triggers switching to Deep Sleep Mode from Deep Sleep-Hold Mode (the arrow HD illustrated in FIG. 2).

6. Summary

It is comparatively easy that a main system and a subsystem selectively process packets received from a wired LAN to hold low power consumption during a sleep mode. However, in a case of a wireless LAN, the main system and the subsystem need to execute a management of a key used for wireless unique security in addition to packet data processing. There is a problem that it is difficult for the subsystem to process the key update process. This prevents the subsystem from responding instead of the main system in the wireless LAN communication.

Thus, when a type of data received from a wireless LAN module is an ordinary network protocol data frame during the sleep mode, the subsystem may execute the processing. On the other hand, when the type of the data received from the wireless LAN module is a data frame related to an event and the key update during the sleep mode, the main system is assumed to be activated to execute the processing.

While this method executes more response processes in the sleep mode to ensure the reduced power consumption, key update frequency and occurrence frequency of the event to be processed by the main system are different in connection states. In view of this, depending on the connection states, when the event frequently occurs, a sleep mode control could not be executed, or a return operation to Ready Mode may be frequently repeated. As a result, it is not possible to ensure the reduced power consumption or the quick processing because of taking long time to return.

In contrast, in the embodiment, the information processing device 1 appropriately switches to Deep Sleep Mode, Deep Sleep-Hold Mode, Light Sleep Mode, or Ready Mode based on an action mode and the connection state of the wireless LAN. This ensures quick and appropriate control of a wireless-LAN function with the information processing device 1 operated in the most power-saving mode based on the action mode and the connection state of the wireless LAN.

Specifically, when the information processing device 1 is switched to a sleep mode from Ready Mode, the sleep modes are switched based on the connection state of the wireless LAN.

More specifically:

(1) When only the wireless LAN module 30 is activated, the access point is not connected and is not in the P2P mode, it is switched to Deep Sleep Mode (it takes a long period to return instead of low power consumption) (Step S104). This ensures the maximally-reduced power consumption.

(2) When the access point is connected, this state suggests long cycle for which the events such as the key update occur. Therefore, the proxy response setting is executed to switch to Deep Sleep Mode (Steps S106 and S107). This simultaneously ensures the maximally-reduced power consumption and the proxy response executed by the subsystem 20.

(3) In the P2P mode, it is switched to Light Sleep Mode (while the power consumption is a little higher than Deep Sleep Mode, a return time is short) because the events may frequently occur (Step S108). This ensures returning to Ready Mode in the shortest return time when the event that requires processing is received via the wireless LAN module 30, in addition to the power consumption reduced as much as possible.

Furthermore, when the proxy response is executed during Deep Sleep Mode, or when the proxy response is inexecutable, a return state is switched based on the event.

More specifically:

(1) When the type of the data frame is unrelated to the wireless unique communication, the sub-wireless LAN module driver 201 executes the proxy response via the wireless LAN module 30 (Step S202). That is, the sub-wireless LAN module driver 201 executes the proxy response still in Deep Sleep Mode where the entire main system 10 is not activated. This ensures the maximally-reduced power consumption.

(2) In a case of processing such as the key update, which is processed by only a control part in the wireless LAN module 30, it is switched to Deep Sleep-Hold Mode (less hardware resources to return and reduced power consumption) (Step S207). Thus, it is only necessary that the minimum necessary hardware resources for controlling the wireless LAN module 30 by the main system 10, that is, only the CPU 11 and the RAM 12 are activated. This ensures the reduced power consumption as much as possible.

(3) When the content of the data frame is the connection request, this requires displaying information indicative of the existence of the connection request on the operation panel 14. This returns to Ready Mode where the operation panel 14 is activated (Step S205). This returns to Ready Mode only when it is necessary to ensure the reduced power consumption as much as possible.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An information processing device comprising:
   a wireless communication unit wirelessly communicable, connected to a wireless network, with an external device;
   a main system that controls the wireless communication unit; and
   a subsystem that controls the wireless communication unit independently from the main system; wherein
   the information processing device is enabled to selectively execute a ready mode in which at least the main system in its entirety is activated, a sleep mode in which at least a portion of the main system is not activated and a sleep-hold mode,
   when the information processing device transitions from the ready mode to the sleep mode, in cases where the main system is connected to the wireless network, the main system determines whether peer-to-peer (P2P) networking is enabled, and if the main system determines that the main system is connected to the wireless network and that P2P networking is disabled, the main system carries out configuring of the subsystem so as to enable the subsystem to respond to the external device via the wireless communication unit during the sleep mode, and the main system transitions to, as the sleep mode, a first sleep mode in which the subsystem is activated without the main system in its entirety being activated,
   if the main system determines that the main system is connected to the wireless network and that P2P networking is enabled, the main system transitions to, as the sleep mode, a second sleep mode in which the time it takes for the main system to restore itself is shorter than in the first sleep mode,
   during the first sleep mode, the subsystem:
      (i) obtains a data frame from the external device via the wireless communication unit,
      (ii) when the subsystem determines that a proxy response to the obtained data frame is executable, responses to the external device via the wireless communication unit,
      (iii) when the subsystem determines that i) the proxy response to the obtained data frame is not executable and ii) the obtained data frame is a connection request, activates the main system to the ready mode, and
      (iv) when the subsystem determines that i) the proxy response to the obtained data frame is not executable and ii) the obtained data frame is not the connection request, activates the main system to the sleep-hold mode by restoring a portion of the main system such that the main system is capable of responding to the external device via the wireless communication unit, and
   a hardware resource amount to activate the main system to the second sleep mode is larger than a hardware resource amount to activate the main system to the sleep-hold mode, the hardware resource amount to activate the main system to the sleep-hold mode is larger than a hardware resource amount to activate the main system to the first sleep mode, and the hardware resource amount to activate the main system to the first sleep mode is larger than a hardware resource amount to activate the main system to the ready mode.

2. The information processing device according to claim 1, wherein:
   when the main system responding to the external device during the sleep mode is necessary, the main system transitions to the ready mode to respond to the external device via the wireless communication unit.

3. The information processing device according to claim 2, wherein the second sleep mode is a wait-for-interrupt mode.

4. The information processing device according to claim 2, wherein if the main system determines that the main system is not connected to the wireless network when the information processing device transitions from the ready mode to the sleep mode, the main system transitions to the first sleep mode as the sleep mode.

5. The information processing device according to claim 1, wherein the subsystem causes a central processing unit and a memory to be restored as the portion of the main system.

6. The information processing device according to claim 1, wherein:
 (v) when the subsystem determines, during the first mode, that a category of the obtained data frame is related to wireless-unique communications and the data frame is the connection request, the subsystem activates the main system in its entirety to restore itself to the ready mode; and
 having been restored to the ready mode, the main system responds to the external device via the wireless communication unit.

7. A non-transitory computer-readable recording medium storing an information processing program to control an information processing device including a wireless communication unit, a main system, and a subsystem, the wireless communication unit being wirelessly communicable with an external device connected to a wireless network, the main system controlling the wireless communication unit, the subsystem controlling the wireless communication unit independently from the main system, the information processing device selectively executing a ready mode in which at least the main system in its entirety is activated, a sleep mode in which at least a portion of the main system is not activated and a sleep-hold mode, wherein the information processing program causes a computer of the main system to:
 when the information processing device transitions from the ready mode to the sleep mode, determine whether the main system is connected to the wireless network and whether peer-to-peer (P2P) networking is enabled;
 if the determining determines that the main system is connected to the wireless network and that P2P networking is disabled, carry out configuring of the subsystem so as to enable the subsystem to respond to the external device via the wireless communication unit during the sleep mode;
 transition to, as the sleep mode, a first sleep mode in which the subsystem is activated without the main system in its entirety being activated; and
 if the determining determines that the main system is connected to the wireless network and that P2P networking is enabled, transition to, as the sleep mode, a second sleep mode in which the time it takes for the main system to restore itself is shorter than in the first sleep mode, and
 wherein during the first mode, the information processing program causes a computer of the subsystem to:
 (i) obtain a data frame from the external device via the wireless communication unit,
 (ii) when the subsystem determines that a proxy response to the obtained data frame is executable, response to the external device via the wireless communication unit,
 (iii) when the subsystem determines that i) the proxy response to the obtained data frame is not executable and ii) the obtained data frame is a connection request, activate the main system to the ready mode, and
 (iv) when the subsystem determines that i) the proxy response to the obtained data frame is not executable and ii) the obtained data frame is not the connection request, activate the main system to the sleep-hold mode by restoring a portion of the main system such that the main system is capable of responding to the external device via the wireless communication unit, and,
 wherein a hardware resource amount to activate the main system to the second sleep mode is larger than a hardware resource amount to activate the main system to the sleep-hold mode, the hardware resource amount to activate the main system to the sleep-hold mode is larger than a hardware resource amount to activate the main system to the first sleep mode, and the hardware resource amount to activate the main system to the first sleep mode is larger than a hardware resource amount to activate the main system to the ready mode.

* * * * *